United States Patent [19]

Cory et al.

[11] Patent Number: 4,777,463
[45] Date of Patent: Oct. 11, 1988

[54] MAGNETIC FIXTURE ASSEMBLY

[75] Inventors: Michael L. Cory, Clinton, Wis.; Donald W. Dean, Rockton, Ill.

[73] Assignee: Dana Corporation, Toledo, Ohio

[21] Appl. No.: 101,379

[22] Filed: Sep. 25, 1987

[51] Int. Cl.⁴ .............................................. H01F 7/20
[52] U.S. Cl. ................................... 335/289; 335/286; 335/291
[58] Field of Search ............... 335/285, 286, 287, 289, 335/290, 291, 295

[56] References Cited

U.S. PATENT DOCUMENTS

| | | |
|---|---|---|
| 1,036,976 | 8/1912 | Downes . |
| 1,081,462 | 12/1913 | Patton . |
| 1,105,552 | 7/1914 | Downes .......................... 335/286 X |
| 1,290,868 | 1/1919 | Arter . |
| 2,449,255 | 9/1948 | Sneckner ............................. 335/286 |
| 2,479,584 | 8/1949 | Meyer ..................................... 279/1 |
| 3,078,565 | 2/1963 | Sanders ........................... 335/286 X |
| 3,389,357 | 6/1968 | Schneider ........................... 335/289 |
| 3,723,928 | 3/1973 | Blakey et al. ....................... 335/285 |
| 3,978,441 | 8/1976 | Sobottka et al. ................... 335/284 |
| 4,075,589 | 2/1978 | Braillon .............................. 335/286 |

*Primary Examiner*—George Harris
*Attorney, Agent, or Firm*—Leydig, Voit & Mayer

[57] ABSTRACT

A fixture for locating a workpiece in a precisely established position comprises a lower magnetic base and an upper fixture plate, the workpiece being fixtured on the plate. The base includes a permanent magnet which normally clamps the plate to the base but which is disabled and releases the plate when an electromagnet in the base is energized. Prior to clamping the plate to the base, the plate is located in a precise edgewise position on the base by quickly insertable and removable dowel pins adapted to be received by the plate and the base with a precision fit.

14 Claims, 2 Drawing Sheets

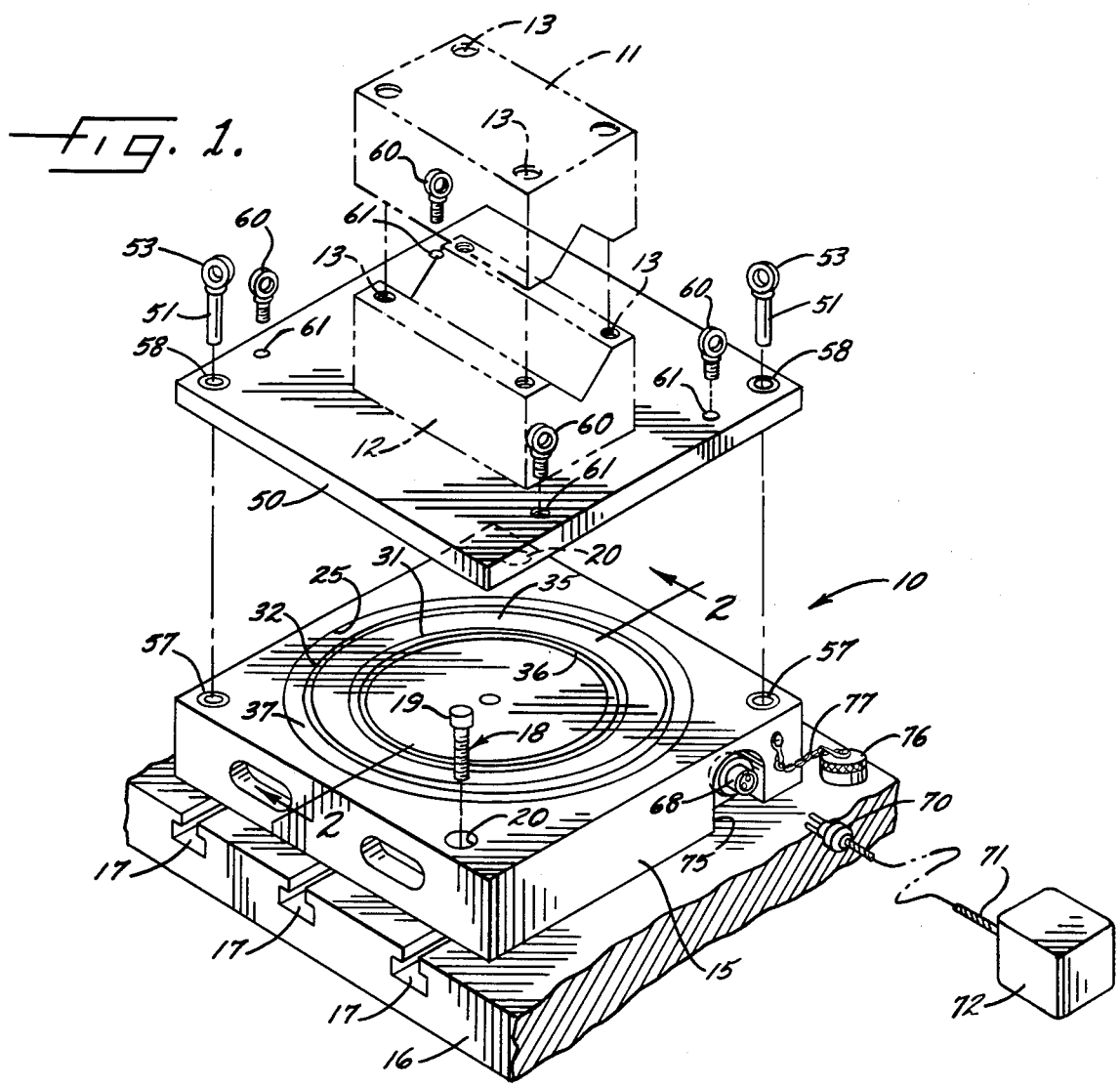
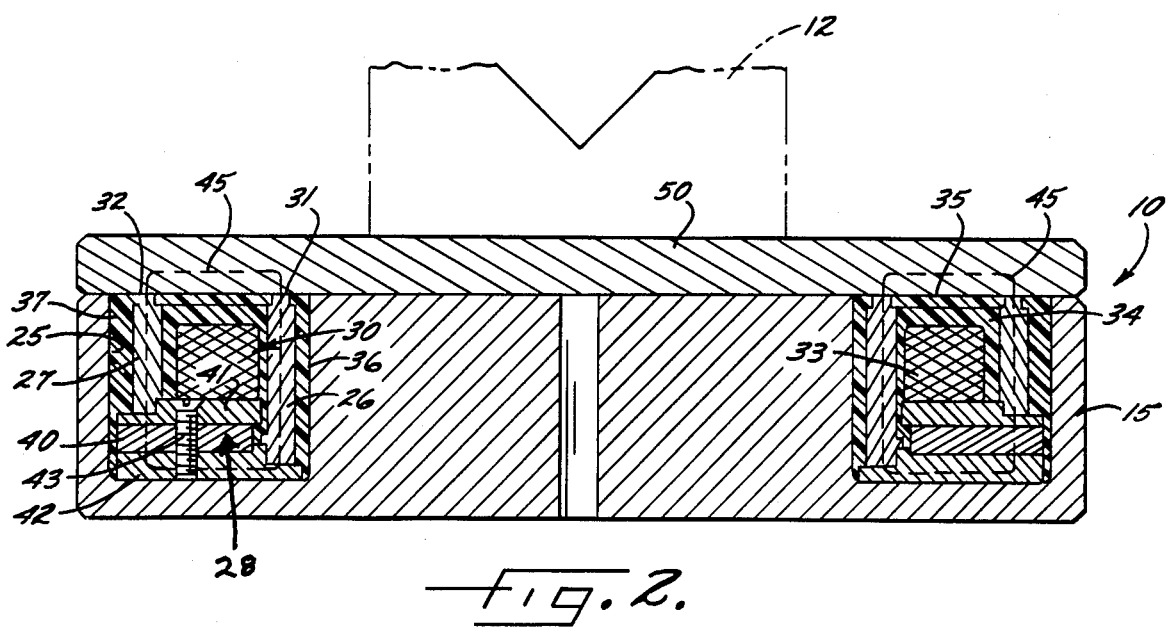

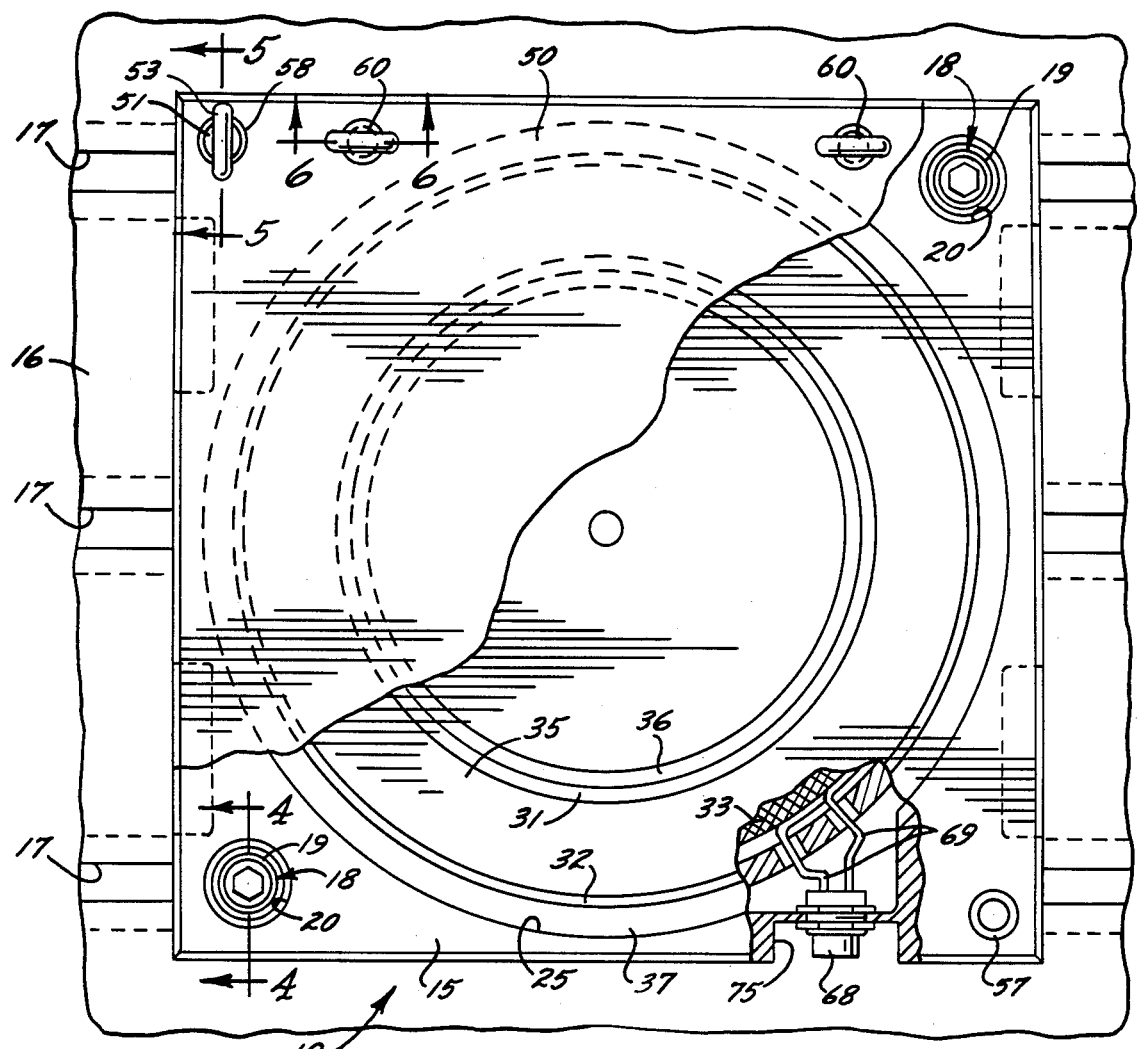
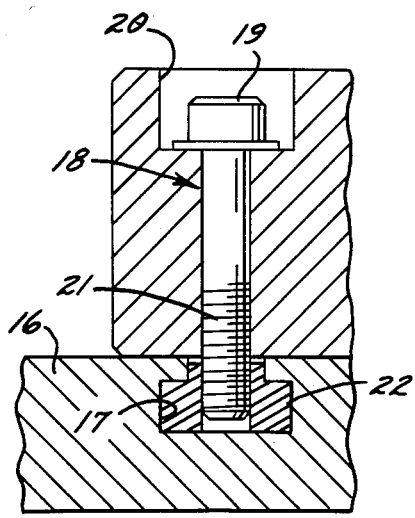
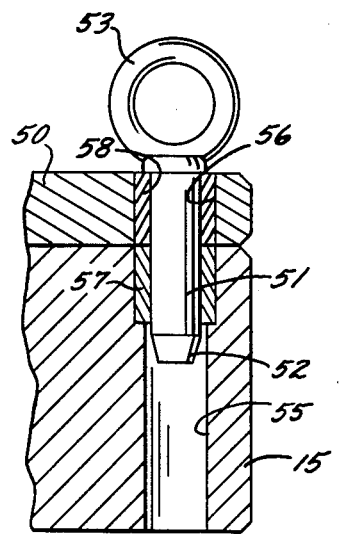
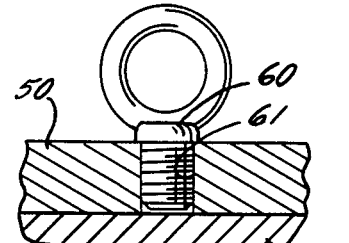
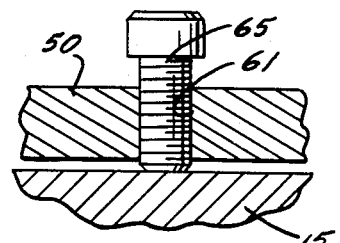

MAGNETIC FIXTURE ASSEMBLY

BACKGROUND OF THE INVENTION

This invention relates generally to a fixture assembly for holding a work piece rigidly and in a precisely established position while a machining operation, an assembly operation or some other operation is being performed on the workpiece.

More particularly, the invention relates to a fixture assembly of the type which preferably includes both a permanent magnet and an electromagnet. The permanent magnet normally creates a magnetic force for clamping or holding a workpiece and is adapted to be disabled temporarily to release the workpiece when the electromagnet is energized. Arrangements of this general type are disclosed in Schneider U.S. Pat. No. 3,389,357; Sobottka et al U.S. Pat. No. 3,978,441 and Braillon U.S. Pat. No. 4,075,589.

SUMMARY OF THE INVENTION

The general aim of the present invention is to provide a new and improved magnetic fixture assembly in which workpieces may be more precisely located and may be more quickly and easily fixtured and released than has been possible with prior fixture assemblies of the same general type.

A more detailed object of the invention is to achieve the foregoing by providing a fixture assembly comprising a magnetic base and comprising a plurality of substantially identical tool plates each equipped with a fixture or jig which is permanently attached to the tool plate in a precisely established position on the plate. Each tool plate is adapted to be mechanically and releasably located in a precise edgewise direction on the base, after which the magnetic force is utilized to clamp the tool plate to the base and lock the tool plate rigidly in position. Upon completion of a machining or assembly operation on the workpiece, the magnetic force is interrupted and the tool plate is removed from the base and replaced with another tool plate.

Another object of the invention is to provide a self-contained magnetic fixture assembly which can be quickly shuttled from place-to-place without being encumbered by electrical leads or other external connections.

The invention also resides in the novel construction permitting quick and easy removal of the tool plates from the base under normal conditions and also permitting separation of a tool plate from the base in case the electromagnet fails and the tool plate remains clamped to the base by the permanent magnet.

These and other objects and advantages of the invention will become more apparent from the following detailed description when taken in conjunction with the accompanying drawings.

BRIEF DESCRIPTION OF THE DRAWINGS

FIG. 1 is an exploded perspective view of a new and improved magnetic fixture assembly incorporating the unique features of the present invention.

FIG. 2 is an enlarged cross-section taken substantially along the line 2—2 of FIG. 1.

FIG. 3 is an enlarged top plan view of the fixture assembly with certain parts broken away and shown in section.

FIGS. 4, 5 and 6 are enlarged fragmentary crosssections taken substantially along the lines 4—4, 5—5 and 6—6, respectively, of FIG. 3.

FIG. 7 is a view similar to FIG. 6 but shows the tool plate being separated from the base in a situation where the electromagnet of the fixture assembly has failed.

DETAILED DESCRIPTION OF THE PREFERRED EMBODIMENT

For purposes of illustration, the invention has been shown in the drawings as embodied in a fixture assembly 10 for rigidly holding a workpiece (not shown) in a precisely located position while a machining, assembly or other operation is being performed on the workpiece. The present fixture assembly has been shown as including fixture means in the form of upper and lower V-blocks 11 and 12. A workpiece (e.g., round or square bar stock) may be placed in an accurately located axial position in the lower V-block and is adapted to be clamped in that position when the upper V-block is secured rigidly to the lower block by screws or the like (not shown) extending through holes 13 in the blocks. It will be appreciated that the fixture means need not necessarily be in the form of the V-blocks which have been shown but indeed can take any form appropriate for a particular workpiece.

The fixture assembly 10 includes a base 15 which herein is in the form of a rectangular block preferably made of aluminum or other material having a high magnetic reluctance. The base 15 is adapted to be clamped rigidly and in a precisely located position on an underlying support. In the present instance, the support has been shown as being the table 16 (FIG. 1) of a machine tool, the table being formed with rows of upwardly opening slots 17 of inverted T-shaped cross-section. Clamping of the base 15 to the table 16 herein is effected by two diagonally spaced screws 18 having heads 19 (FIG. 4) received in counterbores 20 in the upper side of the base 15 and having shanks 21 which are threaded into inverted T-shaped nuts 22 located in appropriate ones of the slots 17. Again, any suitable arrangement may be used for locating and holding the base in a precisely established position relative to the machine tool or other apparatus for operating on the workpiece.

The base 15 is constructed as a magnetic chuck. As shown in FIG. 2, a relatively wide, annular and upwardly opening circular groove 25 is formed in the upper side of the base adjacent the outer periphery thereof. The groove defines a housing for a magnetic structure which, in this particular instance, consists of a pair of inner and outer concentric pole pieces or rings 26 and 27 (FIG. 2), a permanent magnet 28 and an electromagnet 30. The upper ends of the rings 26 and 27 define pole faces 31 and 32 (FIGS. 2 and 3), respectively, which are substantially flush with the upper side of the base.

Herein, the electromagnet 30 comprises a multiple turn winding or coil 33 (FIG. 2) located within an annular bobbin 34 of inverted U-shaped cross-section and made of dielectric material. The bobbin is disposed between the two pole rings 26 and 27 and its upper side is covered by a ring 35 of epoxy. Rings 36 and 37 of epoxy also are located in the groove 25 adjacent the inboard side of the inner pole ring 26 and the outboard side of the outer pole ring 27, respectively. The epoxy bonds the pole rings and the bobbin securely within the groove.

The permanent magnet 28 comprises a series (e.g., twelve) of permanent magnet sections or wafers 40 (FIG. 2) spaced angularly from one another around the groove 25 in the base 15. Each wafer is made of a suitable ceramic or Alnico magnetic material and is permanently magnetized so as to produce a magnetic field. Each wafer is sandwiched between an upper steel ring 41 which underlies the coil 33 and a lower steel ring 42 which rests on the bottom of the groove 25. Angularly spaced screws 43 extend through the upper ring 41, the wafers 40 and the lower ring 42 so as to hold those components together as a unitary assembly.

Magnetic flux produced by the magnetic wafers 40 threads through a path 45 which, for purposes of discussion, may be assumed to extend from the upper faces of the wafers to the upper ring 41, the outer pole ring 27 and the pole face 32. The flux returns by way of the pole face 31, the inner pole ring 26 and then the lower ring 42 to the lower faces of the wafers.

The winding of the coil 33 is wound in such a direction and is adapted to be energized by d.c. voltage of such polarity as to cause the magnetic flux created by the electromagnet 30 to flow in a reverse direction along the path 45 when the electromagnet is excited. As a result, a magnetic field of high intensity exists across the pole faces 31 and 32 when the electromagnet is in a de-energized state and is significantly reduced in intensity when the electromagnet is energized.

In accordance with the primary aspect of the present invention, the magnetic base 15 serves as a common fixture base for a plurality of identical or substantially identical tool or fixture plates 50 which carry the fixture means 11 and 12 and the workpiece which is clamped therein. Each tool plate 50 is particularly characterized in that it is adapted to be quickly and rigidly located in a precisely established position on the base 15 and then is adapted to be quickly removed from the base upon completion of the operation or operations performed on the workpiece.

Only one tool plate 50 has been shown in the drawings. The plate preferably has the same rectangular shape as the base 15 and is made of steel or other material having low magnetic reluctance and capable of carrying magnetic flux. The lower V-block 12 is anchored rigidly and substantially permanently in a precisely established position on the upper side of the plate (see FIG. 1).

In keeping with the invention, mechanical means are provided for locating the plate 50 in a precise edgewise position on the base 15. Herein, these means comprise two steel dowel pins 51 (FIG. 5) each having a downward taper 52 at its lower end and having a circular eye 53 at its upper end. When the plate 50 is clamped to the base 15, the pins 51 are located at diagonally opposite corners of the plate as shown in FIGS. 1 and 3.

Holes 55 and 56 (FIG. 5) are formed through two diagonally opposite corners of the base 15 and the plate 50, respectively. Precision bushings 57 and 58 are pressed tightly into the holes 55 and 56, respectively, and are sized to receive the dowel pins 51 with a very precise and snug but slidable fit.

With the foregoing arrangement, a workpiece may be clamped in the blocks 11 and 12 of the tool plate 50 at any time and while the plate is located at a fixturing station located remotely from the machine tool or other machine for operating on the workpiece. At a selected time, the tool plate 50 with the workpiece fixtured thereon may be brought to a position above the base 15 which, in this instance, is anchored to the table 16 in a precisely established position by the screws 18 and the nuts 22.

When the tool plate 50 is first positioned above the base 15, the electromagnet 30 preferably is in an energized state so as to cancel or substantially cancel the magnetic field created by the permanent magnet 28. As a result, the plate 50 may be lowered onto the base 15 and may be shifted edgewise to the extent necessary to bring the bushings 58 of the plate into vertical alinement with the bushings 57 of the base. As such time, the two dowel pins 51 are inserted into the precise bushings and serve to rigidly anchor the plate 50 against any edgewise movement in either an angular direction or along the rectangular coordinates of the base 15. With the plate so held, the electromagnet 30 is de-energized so as to allow the permanent magnet 28 to draw the plate downwardly and clamp the plate tightly against the base. As the magnetic flux passes between the pole faces 31 and 32, it threads through the steel plate 50.

The electromagnet 30 is kept in a de-energized state while an operation is being performed on the workpiece fixtured by the base 15 and the plate 50. After the operation has been completed, the electromagnet is energized to reduce the intensity of the magnetic field created by the permanent magnet 28 and to permit lifting of the tool plate from the base. Prior to such lifting, the dowel pins 51 are pulled out of the bushings 57 and 58, the eyes 53 facilitating such removal.

Another tool plate 50 then is brought into position above the base 15 and the procedures described above are repeated. The second tool plate (and all other tool plates) has its bushings located exactly at the same positions as the bushings 58 of the first tool plate and thus the same edgewise positioning of the tool plate relative to the base is effected in every instance. This allows every workpiece to be fixtured at a precise position relative to the table 16 and the associated tool in a very quick manner so as to significantly reduce the down time of the tool. In other words, the time required for fixturing at the tool itself is very short.

In some instances, the tool plate 50, the blocks 11 and 12 and the workpiece carried therein may be so heavy as to make it difficult to manually lift and shift the plate. Accordingly, four threaded studs in the form of eye bolts 60 (FIGS. 1, 3 and 6) are adapted to be threaded into tapped holes 61 which are formed through the plate. The eye bolts 60 may be hooked by a sling or the like for purposes of lifting the plate.

Means are provided for effecting separation of the plate 50 from the base 15 in the unlikely event that electrical power is lost or the electromagnet 30 fails and is incapable of reducing the strength of the magnetic field produced by the permanent magnet 28. Herein, these means are in the form of four threaded screws 65 (FIG. 7) which may be inserted into the tapped holes 61 after the eye bolts 60 have been removed therefrom. When the screws 65 are tightened, their lower ends engage the upper side of the base 15 as shown in FIG. 7 and act as jacks to force the plate upwardly from the base and thereby separate the two.

Instead of using a permanent magnet 28 and an electromagnet 30 in combination with one another, it is possible to clamp the tool plate 50 to the base 15 through the use of a continuously energized electromagnet alone. The combination of the two magnets, however, produces certain advantages. First, the permanent magnet 28 will continue to clamp the tool plate 50 rigidly to the base 15 in the event the electromagnet 30 should fail or in the event the voltage supply to the electromagnet is interrupted.

Secondly, there is no need for the fixture assembly 10 to be tethered or encumbered by electrical leads or other external connections and thus the fixture assembly may be moved freely along a transfer line or through a flexible manufacturing system. As shown in FIG. 3, the base 15 is equipped with an electrical terminal 68 which is connected to the leads 69 of the coil 33. In this instance, the terminal is a socket having quick-connect means in the form of a pair of holes for receiving the pins of a plug-type terminal 70 (FIG. 1) which is connected by a lead 71 to a portable d.c. power supply 72. When the electromagnet 30 is to be kept in an energized state—which is only for a relatively short period of time—the plug 70 is simply connected with the socket 68 to enable energization of the electromagnet by the power supply 72. If the fixture assembly 10 is transferred from station-to-station, there may be means at each station for automatically bringing a power supply into coupling relation with the terminal 68.

The terminal 68 is located within and is partially protected by a recess 75 (FIG. 3) formed in one side of the base 15. To further protect the terminal from chips or the like, a cup-like cover 76 (FIG. 1) is adapted to be telescoped releasably over the terminal when the latter is not in use. The cover is tethered to the base 15 by a chain 77.

From the foregoing, it will be apparent that the present invention brings to the art a new and improved magnetic fixture assembly 10 in which the tool plates 50 are not only adapted to be clamped magnetically to the base 15 but also are adapted to be located in a precise edgewise position on the base by means of the quickly insertable and removable dowel pins 51. Thus, the time required for accurately fixturing workpieces at the actual operating stations is significantly reduced.

We claim:

1. A fixture assembly for holding a workpiece in a precisely fixtured position, said assembly comprising a base defining a housing, a permanent magnet housed within said base and operable to create a magnetic field, an electromagnet housed within said base and operable when energized to reduce the strength of said magnetic field, a fixture plate made of a material having low magnetic reluctance, workpiece fixture means attached rigidly to said plate and located in a precisely predetermined position on said plate, said plate being clamped rigidly to said base by said magnetic field when said electromagnet is in a deenergized state, and mechanical means holding said plate in a precisely predetermined angular position on said base and quickly releasable to permit removal of said plate from said base when said electromagnet is energized.

2. A fixture assembly as defined in claim 1 in which said mechanical means comprise a plurality of dowel pins, said base and said plate having a plurality of alined holes for receiving said pins with a snug but slidable fit thereby to locate said plate in said precisely predetermined angular position on said base.

3. A fixture assembly as defined in claim 2 further including eyes on the upper ends of said pins to facilitate removal of said pins from said holes.

4. A fixture assembly as defined in claim 2 in which there are two dowel pins spaced 180° from one another.

5. A fixture assembly as defined in claim 1 further including an electrical terminal on said base and connected electrically to said electromagnet, said terminal having quick connect means for coupling the terminal releasably with a voltage source for energizing said electromagnet.

6. A fixture assembly as defined in claim 5 further including means for selectively covering and uncovering said terminal.

7. A fixture assembly as defined in claim 1 further including eyes attached rigidly to said fixture plate and adapted to be engaged for purposes of removing said plate from said base.

8. A fixture assembly as defined in claim 7 further including tapped holes in said plate, threaded studs screwed into said holes, said eyes being formed on the ends of said studs.

9. A fixture assembly as defined in claim 8 further including threaded screws adapted to be screwed into said tapped holes after removal of said studs from said holes, said screws being sufficiently long to engage said base and being operable when tightened to force said plate away from said base.

10. A fixture assembly as defined in claim 1 further including tapped holes in said plate, and threaded screws threaded into said plate, said screws being sufficiently long to engage said base and being operable when tightened to force said plate away from said base.

11. A fixture assembly for holding a workpiece in a precisely fixtured position, said assembly comprising a generally horizontal base having upper and lower sides, means for accurately locating and rigidly holding said base in a precisely predetermined position, said base being made of a material having a high magnetic reluctance, a pair of annular concentric magnetic poles housed within said base and having pole faces located adjacent the upper side of the base, a permanent magnet housed within said base and operable to create a magnetic field across said pole faces, an electromagnet housed within said base and operable when energized to reduce the strength of said magnetic field, a fixture plate made of a material having low magnetic reluctance, workpiece fixture means attached rigidly to said plate and located in a precisely predetermined position on said plate, said plate being clamped rigidly to said base by said magnetic field when said electromagnet is in a de-energized state, a plurality of sets of alined holes formed in said base and said plate, the alined holes of each set being spaced angularly from the other alined holes, and angularly spaced dowel pins telescoped into said holes with a snug but slidable fit for holding said plate in a precisely predetermined angular position on said base while being quickly releasable to permit quick removal of said plate from said base when said electromagnet is energized.

12. A fixture assembly as defined in claim 11 further including an electrical terminal on said base and connected electrically to said electromagnet, said terminal having quick connect means for coupling the terminal releasably with a voltage source for energizing said electromagnet.

13. A method of holding a workpiece in a precisely fixtured position, said method comprising the steps of:
  (1) providing a base defining a housing, said base having a permanent magnet capable of creating a magnetic field, said base also having an electromagnet which is operable when energized to reduce the strength of said magnetic field;
  (2) providing a plurality of fixture plates each made of a material having low magnetic reluctance and each having fixture means attached rigidly to and located in a precisely predetermined position on the respective plate;

(3) anchoring a workpiece in a precise position relative to each of said fixture means;

(4) using releasable mechanical locators to fix one of said plates releasably in an accurately established edgewise position on said base and relying on said magnetic field to clamp said plate rigidly to said base;

(5) energizing said electromagnet and removing said one plate from said base after an operation has been performed on the workpiece anchored to the fixture means of said one plate; and (6) successively repeating steps (4) and (5) in sequence for each of the other plates.

14. A method as defined in claim 13 in which said electromagnet is maintained in an energized state while each plate is being fixed in said accurately established edgewise position on said base by said releasable mechanical locators, and de-energizing said electromagnet after each plate has been so fixed and prior to the performance of said operation on the workpiece which is anchored to the fixture means of such plate.

* * * * *